United States Patent [19]
Seki et al.

[11] 4,369,523
[45] Jan. 18, 1983

[54] REMOTE CONTROL SYSTEM OF AN OPTICAL REPEATER

[75] Inventors: Norio Seki, Tokyo; Yohtaro Yatsuzuka, Yokohama; Haruo Sakaguchi, Tokyo, all of Japan

[73] Assignee: Kokusai Denshin Denwa Co., Ltd., Tokyo, Japan

[21] Appl. No.: 158,344

[22] Filed: Jun. 10, 1980

[30] Foreign Application Priority Data

Jun. 19, 1979 [JP] Japan .................. 54-76342

[51] Int. Cl.³ .......................................... H04B 9/00
[52] U.S. Cl. ............................... 455/601; 179/170 A; 375/3
[58] Field of Search ............... 455/601, 603; 340/167 A; 179/170 A, 170 J, 175.31 R; 375/3, 4; 371/22

[56] References Cited

U.S. PATENT DOCUMENTS

| | | | |
|---|---|---|---|
| 4,047,107 | 9/1977 | Dickinson | 340/167 A |
| 4,122,358 | 10/1978 | Altmann | 375/3 |
| 4,136,267 | 1/1979 | Foster et al. | 179/170 A |
| 4,211,920 | 7/1980 | Wakabayashi | 455/601 |
| 4,271,513 | 6/1981 | Maejima et al. | 371/22 |

OTHER PUBLICATIONS

Golomb–Digital Communications with Space Applications, Prentice-Hall Inc., pp. 173–174.

Primary Examiner—Joseph A. Orsino, Jr.
Attorney, Agent, or Firm—Ratner & Prestia

[57] ABSTRACT

In an optical digital communication system having a plurality of optical repeaters inserted in an optical fiber cable, and a pair of terminal stations installed at the extreme ends of the optical fiber cable, the designation of the particular repeater from the terminal station is performed by the remote control signal which has the pulse pattern with the period designated to each repeater. Each repeater may have a plurality of switches for switching lasers for improving the operational reliability of the same by the redundant technique, and the control and/or the designation of the particular switch is also performed by said remote control signal by selecting the particular period and/or the repetition numbers of the period of the pulse pattern. Since the pulse pattern with the particular period and/or the repetition times of the period, and/or the repetition times and the sequence of the periods are utilized for designating the particular repeater and the switch in the designated repeater, the large number of objects (repeaters and switches) can be controlled, and the operational reliability of the control (designation) is very high.

4 Claims, 27 Drawing Figures

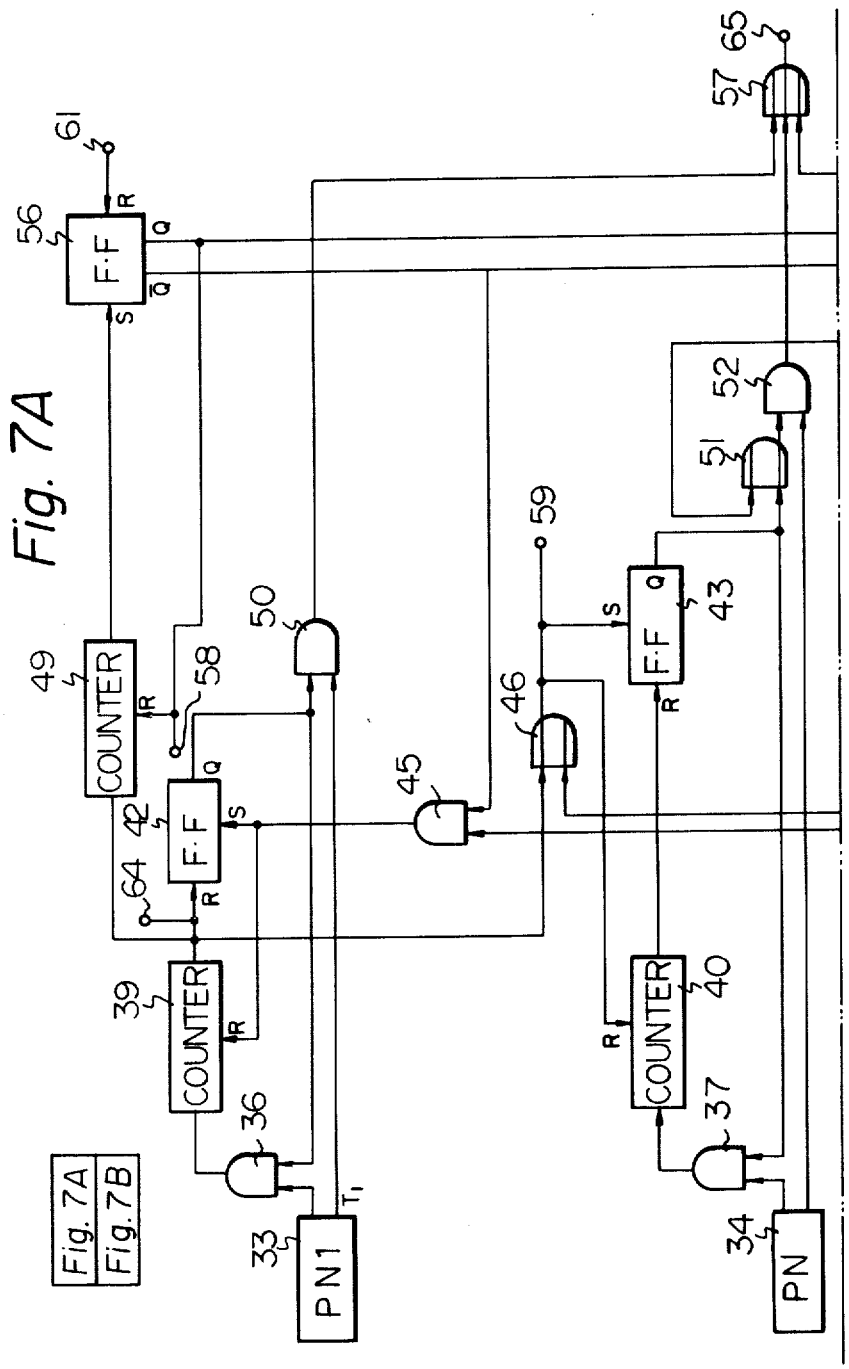

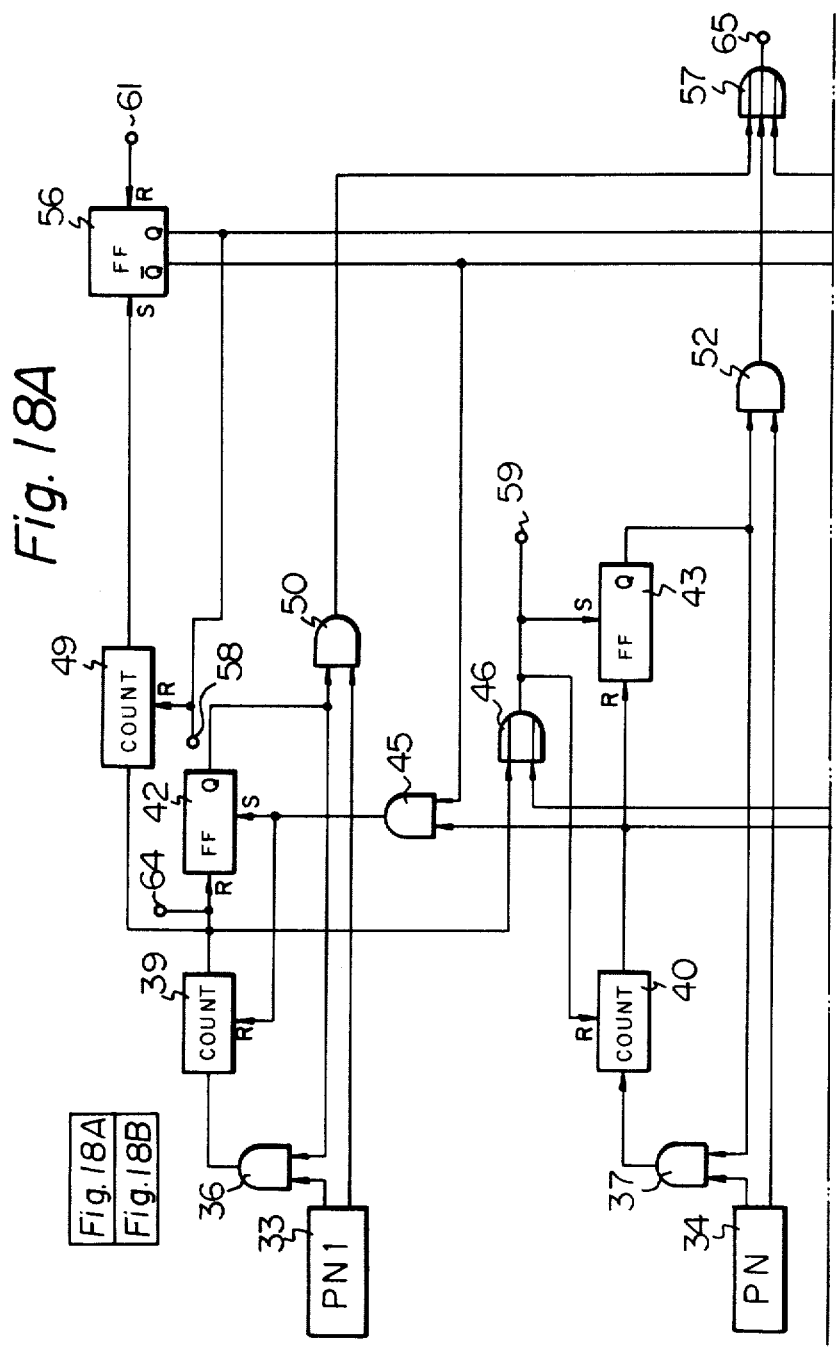

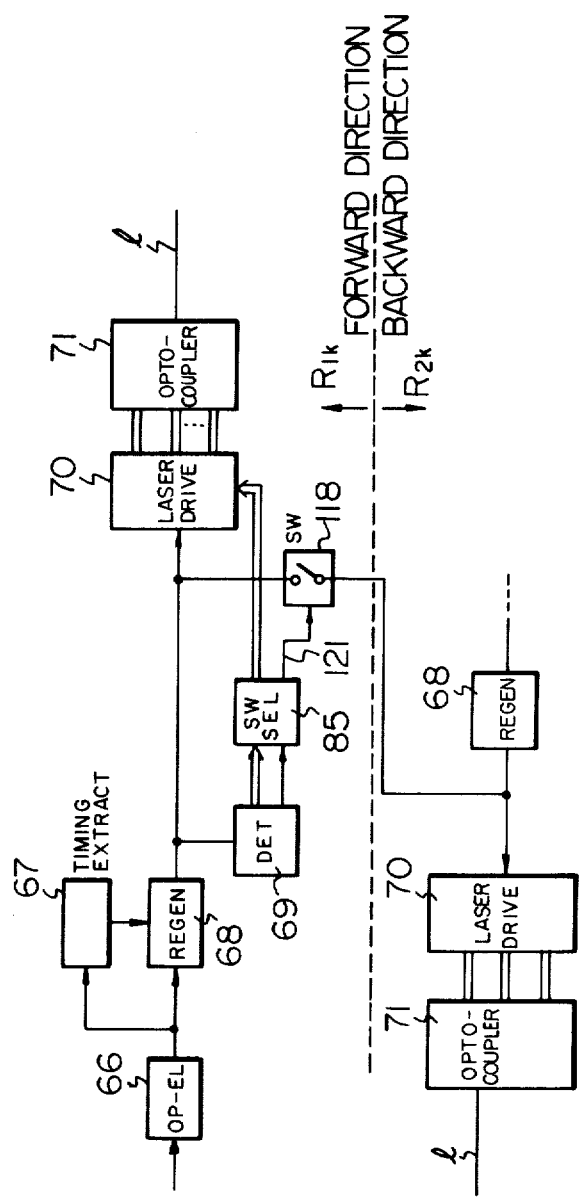

REMOTE CONTROL SYSTEM OF AN OPTICAL REPEATER

BACKGROUND OF THE INVENTION

The present invention relates to a remote control system of an optical repeater for the transmission of a digital signal so that the operation of each optical repeater is controlled at terminal stations installed at the extreme ends of the optical fiber cable.

In an optical communication system utilizing optical repeaters inserted in an optical fiber cable, the operational reliability of components in an optical repeater is not high, and so a redundant arrangement of components in an optical repeater must be adopted, so that when there is something wrong with the particular component the switching is effected to one of the standby components. Also, an optical repeater has many switches for composing a return path so that a terminal station can close that return path and test the operation of each repeater by transmitting a test signal and receiving the same through that return path.

Accordingly, each of the switches installed in each repeater must be controlled remotely from a terminal station individually in order to test and/or replace a component and/or a repeater itself.

A prior remote control system of an optical repeater utilizes an interstitial cable which is installed along a communication cable for transmitting a control signal. However, that interstitial cable system has the disadvantage that the price of a cable is high and the structure of a cable is complicated. Further, a prior remote control system transmits the control signal in a digital form with high transmission speed. Therefore, when there is a noise in a communication line, and that control signal has a transmission error, the wrong control is performed. Thus, the operational reliability of the control is not high.

SUMMARY OF THE INVENTION

It is an object of the present invention to overcome the disadvantages and limitations of a prior remote control system of an optical repeater by providing a new and improved remote control system of an optical repeater.

It is also an object of the present invention to provide a remote control system of an optical repeater which has many control objects and controls each of the objects (repeaters and/or switches in the designated repeater) with high operational reliability, without utilizing an interstitial cable.

The above and other objects are attained by a remote control system of an optical repeater comprising of a plurality of optical repeaters inserted in an optical fiber line a pair of terminal stations installed at the ends of the optical fiber line for the digital communication between said terminal stations, each of said optical repeaters having a plurality of switches for controlling the operation of the repeater, each of said switches being controlled by one of said terminal stations, one of the terminal stations having a remote control signal generator for transmitting the remote control test signal to the other terminal station only through the same optical fiber line and the repeaters, said remote control test signal being in the digital form having the pulse pattern with a predetermined period and a predetermined number of repetitions of said period and said period and the repetition times designating the particular repeater and the particular switch in the designated repeater, each optical repeater has a remote control signal detector which recognizes the remote control test signal as designating the particular repeater and the particular switch in the particular repeater. In addition, each optical repeater has means for accepting the remote control test signal without change and without a separate pulse generator for testing the particular repeater and the particular switch by using the pulse pattern to perform the tests and transmitting the pattern back to the terminal station.

BRIEF DESCRIPTION OF THE DRAWINGS

The foregoing and other objects, features, and attendant advantages of the present invention will be highly understood by means of the following description and accompanying drawings wherein;

FIGS. 7A and 7B are a block diagram of the remote control signal generator for the use of the control signal of FIG. 6, FIGS. 18, 18A and 18B are a block diagram of the remote control signal generator for the use of the control signal of FIG. 17, FIG. 20 is a block diagram of an optical repeater having the return path of a control signal.

DESCRIPTION OF THE PREFERRED EMBODIMENTS

Figure 1:
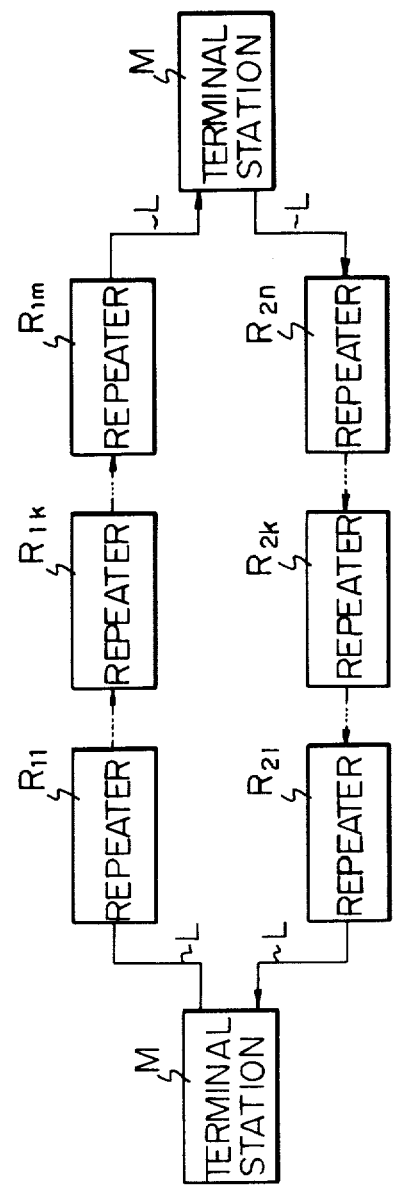
FIG. 1 is the general diagram of an optical communication system for the general explanation of the present invention.

FIG. 1 shows the optical communication system for the explanation of the present invention, and the reference symbol M is a remote control signal generator installed in a terminal station provided at the extreme end of the optical fiber cable, $R_{1l}$, $R_{1k}$, $R_{1m}$ are optical repeaters inserted in the optical fiber cable L, and $R_{2l}$, $R_{2k}$ and $R_{2m}$ are optical repeaters inserted in the other direction in the optical fiber cable L.

Figure 2:
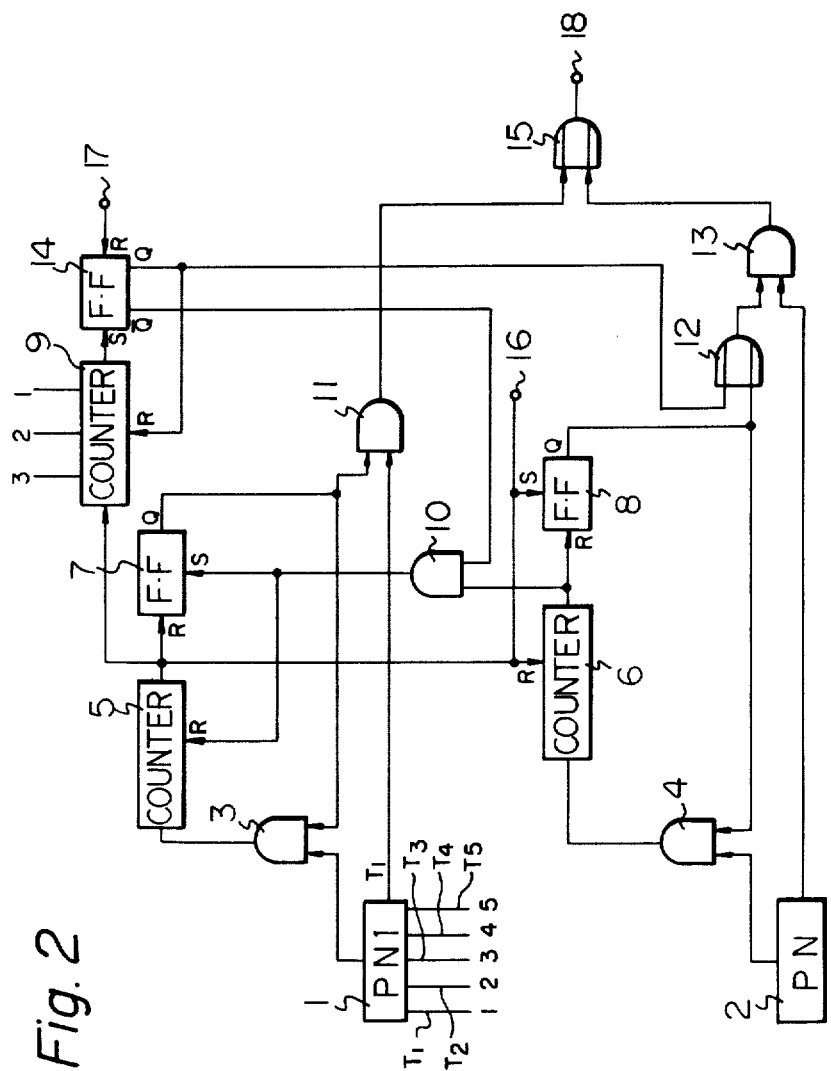
FIG. 2 is a block diagram of the remote control signal generator M in FIG. 1.
Figure 3:
FIG. 3 is an example of the format of the remote control signal.

FIG. 2 is the embodiment of the remote control signal generator M which generates the remote control signal (PN and $PN_1$) having the predetermined period as shown in FIG. 3.

In FIG. 2, the reference numeral 1 is a pulse generator for providing the predetermined period ($T_i$) of pulse and the generated pulse pattern is either a fixed pattern, a PN (pseudo noise) pattern, or the combination of fixed pattern and PN pattern. 2 is another pulse generator for providing a pulse train which does not have a periodicity or at least does not have the period assigned to the repeater, 3, 4, 10 and 13 are AND circuits. Also, 12 and 15 are OR circuits, 5, 6 and 9 are counters, 7, 8 and 14 are flip-flops, 16 and 17 are input terminals for receiving the remote control signal start pulse which is provided when the remote control signal must be transmitted, and 18 is an output terminal of the remote control signal.

FIG. 3 shows the configuration of the remote control signal generated by the apparatus of FIG. 2, and $PN_1$ is the pulse train generated by the first pulse generator 1, and PN is the pulse train generated by the second pulse generator 2. The predetermined period $T_i$ in the pulse train $PN_1$ and the number of occurence of that predetermined period $T_i$ in the predetermined duration indicate the particular repeater, and/or the particular switch.

In the embodiment of FIG. 2, the period ($T_i$) of the pulse generator is one of $T_1$, $T_2$, $T_3$, $T_4$ and $T_5$ depending upon the input control signal applied to the generator 1, and the particular period $T_i$ corresponds to the repeater to be designated. Also, the number of occurance of that particular period designates the particular switch in the designated repeater. In the embodiment of FIG. 3, the pattern $PN_1$ appears three times, therefore, the third switch in the designated repeater is controlled.

The operation of the apparatus of FIG. 2 is as follows. When a remote control signal must be transmitted, a remote control pulse start pulse is applied to the input terminals 16 and 17, and the counter 6 is reset to zero, and the flip-flop 8 is set to ON status. Therefore, the output of the pulse generator 2 is provided to the output terminal 18 through the AND circuit 13 and the OR circuit 15. In this case, in order to determine the length of the PN pulse from the pulse generator 2, the counter 6 counts the number of repetitions of the pattern in PN which is applied to the counter 6 through the gate 4, and when those repetitions reach the predetermined value, the counter 6 provides the output which resets the flip-flop 8. Then, the AND circuit 13 which receives the control signal from the output of the flip-flop 8 through the OR circuit 12, is closed, and the output of the PN series stops. The output of the counter 6 is also applied to the counter 5 and the flip-flop 7 through the AND circuit 10 to reset the former and set the latter. When the flip-flop 7 is set, the AND circuit 11 opens, and then, the output of the first pulse generator 1 is provided to the output terminal 18 through the AND circuit 11 and the OR circuit 15. The output of the pulse generator 1 is also applied to the counter 5 through the AND circuit 3 in order to determine the length of the pattern $PN_1$ from the generator and said counter 5 counts the frame signals from the generator 1. In this case, the period of the pulse pattern $PN_1$ of the generator 1 is determined to one of $T_1$ through $T_5$ by the input control signal corresponding to the repeater to be designated. When the content of the counter 5 reaches the predetermined value, the counter 5 provides the output which resets the flip-flop 7 and then the output of the flip-flop 7 closes the AND circuit 11, then the output ($PN_1$) of the generator 1 stops. The output of the counter 5 is also applied to the counter 6 and the flip-flop 8 to reset the former and set the latter, then, the pattern PN of the pulse generator 2 is provided again to the output terminal 18. Further, the output of the counter 5 is applied to the counter 9 which counts the number of transmission of $PN_1$, corresponding to the switch to be designated in the designated repeater. The counter 9 provides the output signal when the content of the same reaches the predetermined value, which is controllable by an external signal (1, 2, 3). When the third switch in the repeater is to be designated, the third external signal line is active, and the counter 9 provides the output signal when it counts three input signals. When the counter 9 counts the predetermined inputs, the counter 9 resets the flip-flop 14, which closes the AND circuit 10, which prevents the $PN_1$ transmitted from the output terminal 18. The output of the flip-flop 14 is also applied to the AND circuit 13 through the OR circuit 12, and thus, the pattern PN of the generator 2 is continuously transmitted. According to the above operation, the remote control signal as shown in FIG. 3 is obtained. The output of the apparatus in FIG. 2 is transmitted to a communication line (not shown) and the particular switch in the particular repeater is controlled by that output.

In the embodiment of FIG. 3, three $PN_1$ patterns each having the period $T_1$ are repeated. Thus, the third switch in the repeated ($T_1$) is designated and controlled.

In FIG. 2, the counter 5 is provided to keep the transmission time long enough to detect the particular period $T_1$ in the pattern $PN_1$ for the designated repeater, and the counter 6 is provided to keep the transmission time of the pattern PN until the designated repeater does not detect the particular period $T_1$ in the pattern $PN_1$. Also, the counter 9 is provided to control the number of transmissions of the pattern $PN_1$, and according to the number of transmissions of the pattern $PN_1$, the switch in the designated repeater is selected and switched. When the number of switches in a repeater is few, the repeater and/or the switch may be designated merely by the particular period ($T_i$) and the number of transmission times of that period, as in the case of FIGS. 2 and 3.

A PN generator is obvious to those skilled in the art, and is shown in "Communications with space application" by S. W. Golomb, Prentice-Hall, Inc USA, 1964, pp 173-174.

According to the preferable embodiment, the bit rate of the transmission signal is 280 Mb/S (mega-bits per second), and a monolythic crystal filter (center frequency is 4–15 MHz) is utilized as a bandpass filter for detecting the particular period of the PN pattern. In that case, the period of the $PN_1$ may be 36 bits through 70 bits, thus, 36 (=70−36+1) repeaters can be designated.

Figure 4:
FIG. 4 is another example of the format of the remote control signal.
Figure 5:
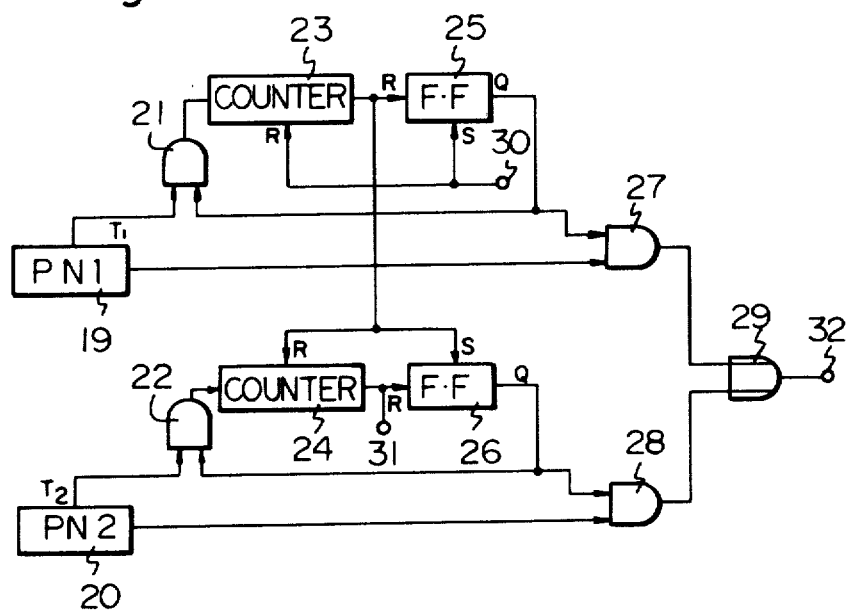
FIG. 5 is a block diagram of the remote control signal generator for the use of the control signal of FIG. 4.

FIG. 4 is another embodiment of the format of the remote control signal, and FIG. 5 is a block diagram of the apparatus for generating the format of FIG. 4. In the embodiment of FIGS. 4 and 5, the designated repeater detects first the particular period $T_1$ in the pattern $PN_1$, and then, detects another period $T_2$ within the predetermined time in the pattern $PN_2$ to control the designated switch. That is to say, the repeater and/or the switch in the designated repeater is designated according to a plurality of particular periods and the predetermined sequence of those periods. FIG. 4 is the example that there are two periods included, and the repeater and the two switches in that repeater are designated by the two periods and the sequence of those periods. In some modification of that embodiment, the repeater is designated by the combination of two periods, and one of the two switches is designated by the sequence of those two periods.

In case, that each period $PN_1$ and $PN_2$ can have 35 periods ($T_1$ through $T_{35}$), the format of FIG. 4 can differentiate 595 repeaters ($_{35}C_2 = 35 \times 34/2 = 595$), while the format of FIG. 3 can only differentiate 35 repeaters.

In FIG. 5, the reference numerals 19 and 20 are pulse generators for providing the pulse trains having the periods $T_1$ and $T_2$, respectively. 21, 22, 27 and 28 are AND circuits, 23 and 24 are counters, 25 and 26 are flip-flops, 29 is an OR circuit, 30 and 31 are input terminals for receiving the remote control signal start pulse, and 32 is an output terminal for providing the remote control signal.

Upon request of the remote control signal, the remote control signal start pulse is applied to the input terminals 30 and 31, and then, the flip-flop 25 is set and the flip-flop 26 is reset. Also the counter 23 is reset to zero. When the flip-flop 25 is set, the pattern $PN_1$ ($=T_1$) of the pulse generator 19 appears at the output terminal 32 through the AND circuit 27 and the OR circuit 29. The counter 23 counts the number of frame pulses of the pattern $PN_1$ from the generator 19 through the AND circuit 21 in order to determine the duration of the pattern $PN_1$ at the output terminal 19. When the content of the counter 23 reaches the predetermined value, the counter 23 provides the output, which resets the flip-flop 25 to close the AND circuit 27 to stop the transmission of the pattern $PN_1$. On the other hand, the output of the counter 23 resets the counter 24 to zero and sets the flip-flop 26 which opens the AND circuit 28. Then, the pattern $PN_2$ having the period $T_2$ from the pulse generator 20 appears at the output terminal 32 through the AND circuit 28 and the OR circuit 29. The transmission time or the duration of that pattern $PN_2$ is controlled by the counter 24 which counts the frame signals of the pattern $PN_2$ through the AND circuit 22. When the content of the counter 24 reaches the predetermined value, the counter 24 provides the output which resets the flip-flop 26 to close the AND circuit 28, then, the pattern $PN_2$ stops. By repeating the above operation, the pattern shown in FIG. 4 is transmitted as the remote control signal, and the repeater having the sequence ($T_1T_2$) is designated.

Figure 6:
FIG. 6 is another example of the format of the remote control signal.

FIG. 6 shows another format of the remote control signal in which the combination of a plurality of periods and the number of each periods in the predetermined duration designates the repeater and/or the switch in the repeater. In FIG. 6, the symbol $PN_1$ is the pulse series having the period $T_1$, and the symbol $PN_2$ is the pulse series having the period $T_2$. The presence of the periods $T_1$ and $T_2$, the sequence of those two periods, and the number of each of those periods designate the particular repeater, and/or the particular switch in the designated repeater.

Figure 7B:
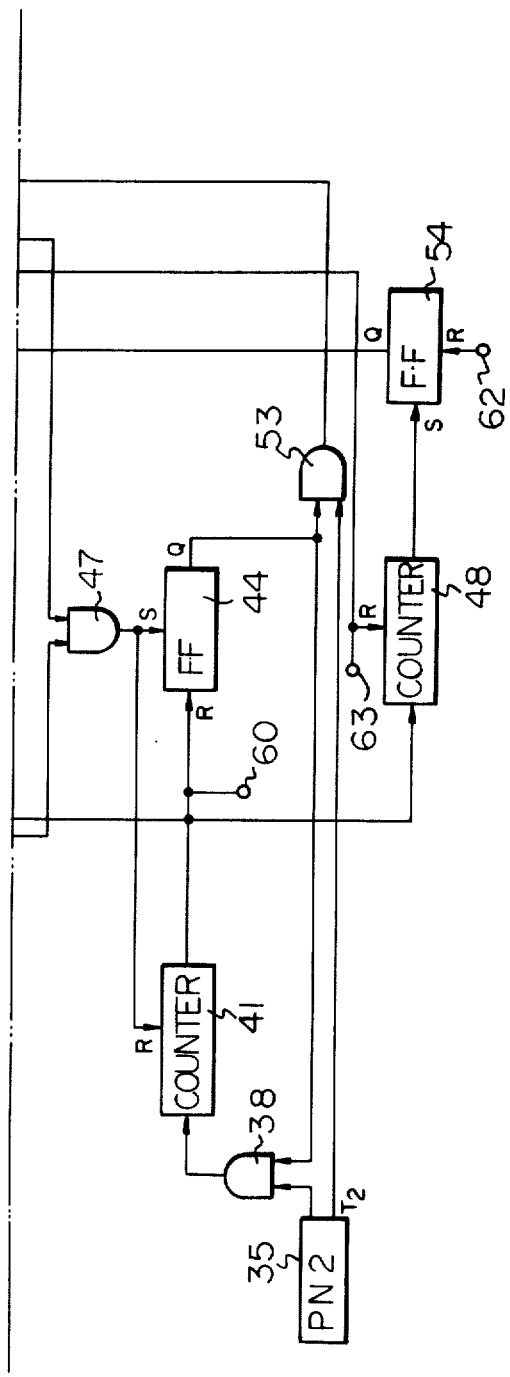

FIG. 7 is a block diagram of the remote control signal generator for providing the format of FIG. 6. In FIG. 7, the reference numeral 33 is a pulse generator for providing a pulse series having the period $T_1$, 34 is another pulse generator for providing a pulse series having the period which is not utilized for designating a repeater, 35 is still another pulse generator for providing a pulse series having the period $T_2$. Also, 36, 37, 38, 45, 47, 50, 52 and 53 are AND circuits, 39, 40, 41, 48, and 49 are counters, 42, 43, 44, 54, and 56 are flip-flops, 46, 51 and 57 are OR circuits, 59, 60, 61, 62, 63 and 64 are input terminals for receiving the remote control signal start pulse, and 65 is an output terminal for providing the resultant remote control signal.

The operation of the apparatus of FIG. 7 is as follows. When the start pulse is applied to the input terminals 59, 60, 61, 62, 63 and 64, the flip-flops 42, 44, 56 and 54, and the counters 48, 49 and 40 are reset to zero. Also, the flip-flop 43 is set, then, the output Q of the flip-flop 43 opens the AND circuit 52 through the OR circuit 51, then, the pulse series PN of the pulse generator 34 is applied to the output terminal 65 through the AND circuit 52 and the OR circuit 57. At the same time, the output of the generator 34 is applied to the counter 40 through the AND circuit 37 in order to control the duration of the pattern PN. When the content of the counter 40 reaches the predetermined value, the counter provides the output, which resets the flip-flop 43, and then, the AND circuit 52 is closed, thus, the pattern PN of the generator 34 does not appear at the output terminal 65 any more.

The output of the counter 40 is also applied to the flip-flop 42 and the counter 39 through the AND circuit 45 and sets that flip-flop 42 and resets the counter 39. Then, the output Q of the flip-flop 42 opens the AND circuit 50, which passes the pulse series $PN_1$ having the period $T_1$ of the pulse generator 33 to the output terminal 65 through the OR circuit 57. The output of the pulse generator 33 is also applied to the counter 39 through the AND circuit 36, and said counter 39 counts the frame pulses of the output of the generator 33 in order to control the duration that the pattern $PN_1$ is transmitted. When the content of the counter 39 reaches the predetermined value, said counter applies the output to the flip-flop 42 to reset the same, and then, the AND circuit 50 is closed. Thus, the pattern $PN_1$ is stopped. The output of the counter 39 is also applied to the counter 49 which counts the number of outputs of the counter 39. That is to say, the counter 49 counts how many times the counter 39 reaches the predetermined value. The output of the counter 39 is further applied to the counter 40 and the flip-flop 43 through the OR circuit 46, and resets the former and sets the latter. Then, the pattern PN of the generator 34 is provided at the output terminal 65 again. The above operation is repeated, and the pattern PN and the pattern $PN_1$ of the generators 34 and 33 respectively are provided at the output terminal 65 alternately until the content of the counter 49 reaches the predetermined value. When the content of the counter 49 reaches the predetermined value, the counter 49 sets the flip-flop 56, which closes the AND circuit 45 and opens the AND circuit 47. Therefore, when the predetermined length of the pattern PN has been transmitted, the counter 41 is reset by the output of the flip-flop 47, and the flip-flop 44 is set by the output of the flip-flop 47. The flip-flop 44 thus set opens the AND circuit 53, which passes the pattern $PN_2$ having the period $T_2$ of the pulse generator 35 at the timing $t_1$ and/or $t_2$ of FIG. 6. Next, in order to control the duration of the pattern $PN_2$, the frame pulse of the output of the generator 35 is applied to the counter 41 through the AND circuit 38, and the counter 41 counts that frame pulse. When the content of the counter 41 reaches the predetermined value, the counter 41 resets the flip-flop 44, which closes the AND circuit 53 to stop the pattern $PN_2$ of the generator 35. The output of the counter 41 is also applied to the counter 48, which counts the number of the outputs of the pattern $PN_2$. When the content of the counter 48 reaches the predetermined value, that is to say, when the pattern $PN_2$ is transmitted the predetemined times, the counter 48 sets the flip-flop 54, which opens the AND circuit 52 through the OR circuit 51. Then, the pattern PN of the generator 34 is transmitted continuously. When the content of the counter 48 is less than the predetermined value, the counter 48 does not provide the output to the flip-flop 54, and in that case, the pattern PN and the pattern $PN_2$ are applied to the output terminal 65 alternately. By repeating the above operation, the remote control signal as shown in FIG. 6 is obtained. Thus, the plurality of periods and/or the sequence of each periods designate the particular repeater, and the particular switch in the repeater is designated and controlled according to the number of the transmission of the pattern having the predetermined period. When the number of switches to be designated in a repeater is few, the repeater can be designated by the particular periods and the sequence of those periods, and/or the number of transmissions of each of the periods. Further, when the number of repeaters to be designated is small, and the number of switches in a repeater is large, a repeater can be designated by the particular periods, and one of the switches in the repeater can be designated by the sequence of the periods and/or the number of transmissions of each of the periods.

Now, the detection of the remote control signal in an optical repeater will be described.

Figure 8:
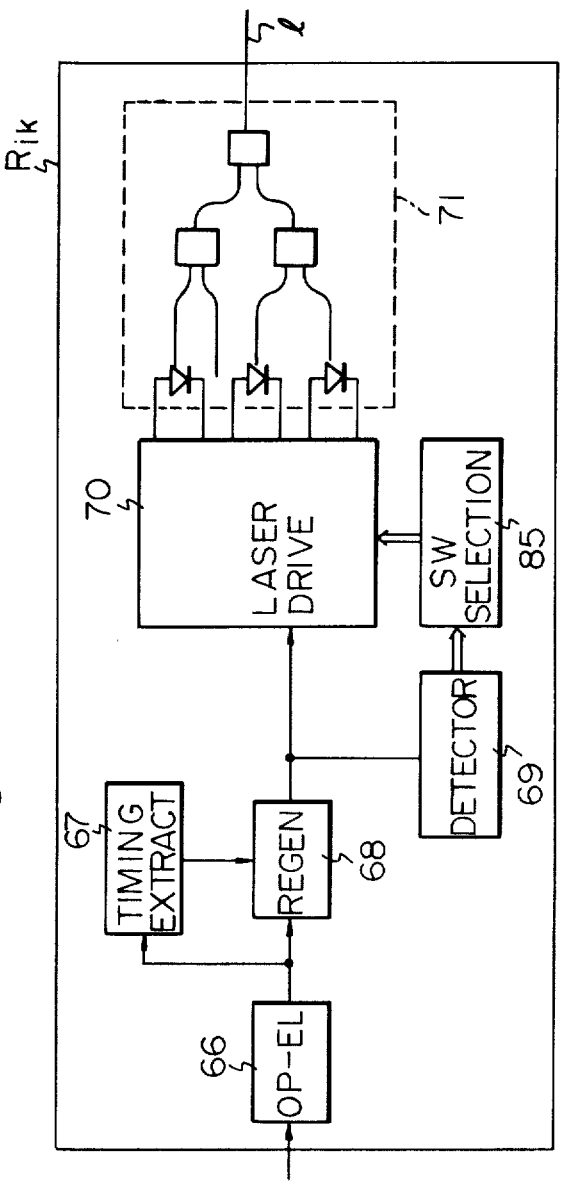
FIG. 8 is an optical repeater having a remote control signal detector.

FIG. 8 is the block diagram of an optical repeater having the detector for the remote control signal. In FIG. 8, the reference numeral 66 is an opto-electrical converter which is supposed to include an photo-cell, an amplifier and an equalizer, 67 is a timing extracting circuit, 68 is a regenerating circuit, 69 is a remote control signal detector, 70 is a laser driving circuit which includes a bias circuit for a laser, 85 is a switch selection circuit for the selection of one of lasers, 71 is an optocoupler for coupling the outputs of a plurality of lasers to an optical fiber cable 1. FIG. 8 is the example that a repeater has a plurality of lasers for transmitting an optical energy for improving the operational reliability of an optical source through the redundant arrangement, and one of them is selected by the remote control signal from a terminal station. When there is something wrong with the selected laser, the remote control signal switches the laser to another good one.

The switching of lasers is performed by switching a bias source of each laser, and the optical outputs of each laser are always coupled to an optical fiber cable through a fixed optical coupler. Further, a repeater may have a switch (not shown) for providing a return path for reflecting the test signal from a terminal station to the terminal station in order to test the operation of the repeater. In that case, that switch is also controlled by the remote control signal from a terminal station. As one of modifications of FIG. 8, the input of the remote control signal detector 69 can be obtained from the output of the converter 66, instead of the output of the regenerator 68 of FIG. 8.

Figure 9:
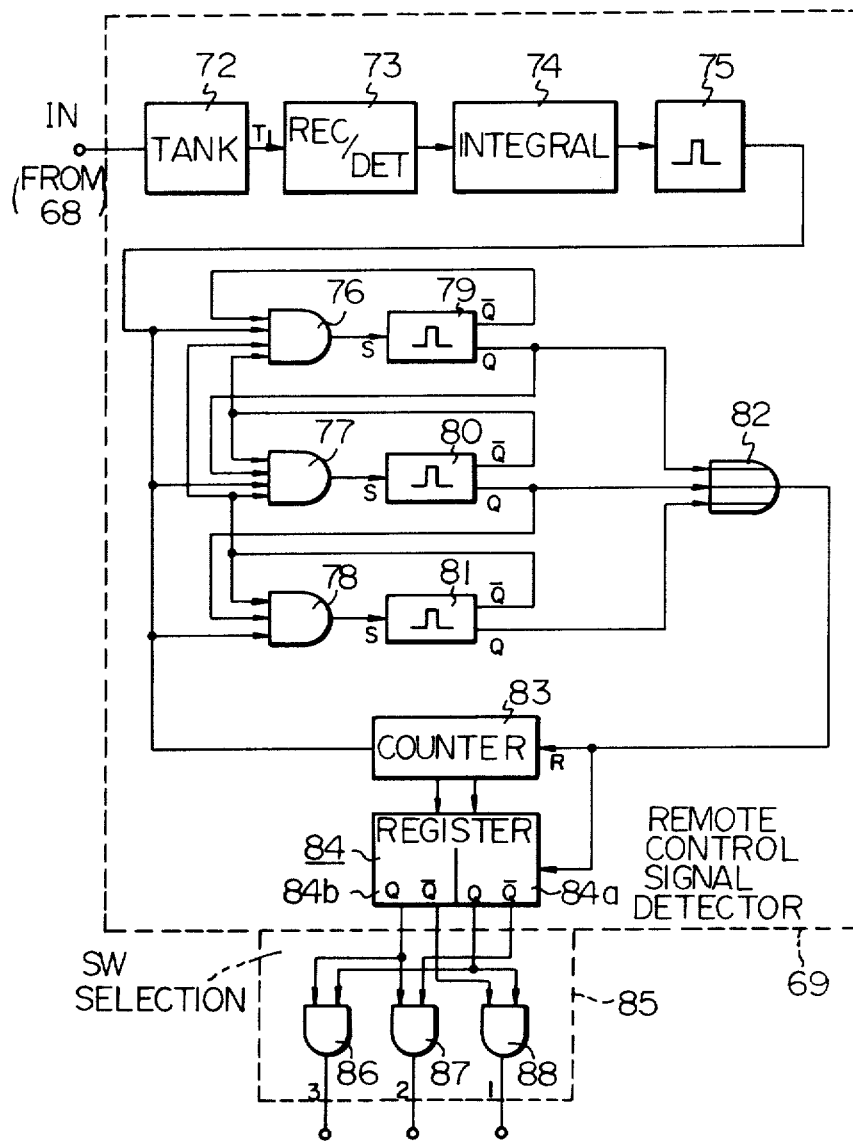
FIG. 9 is a block diagram of a remote control signal detector for the use of the control signal of FIG. 3.
Figure 10:
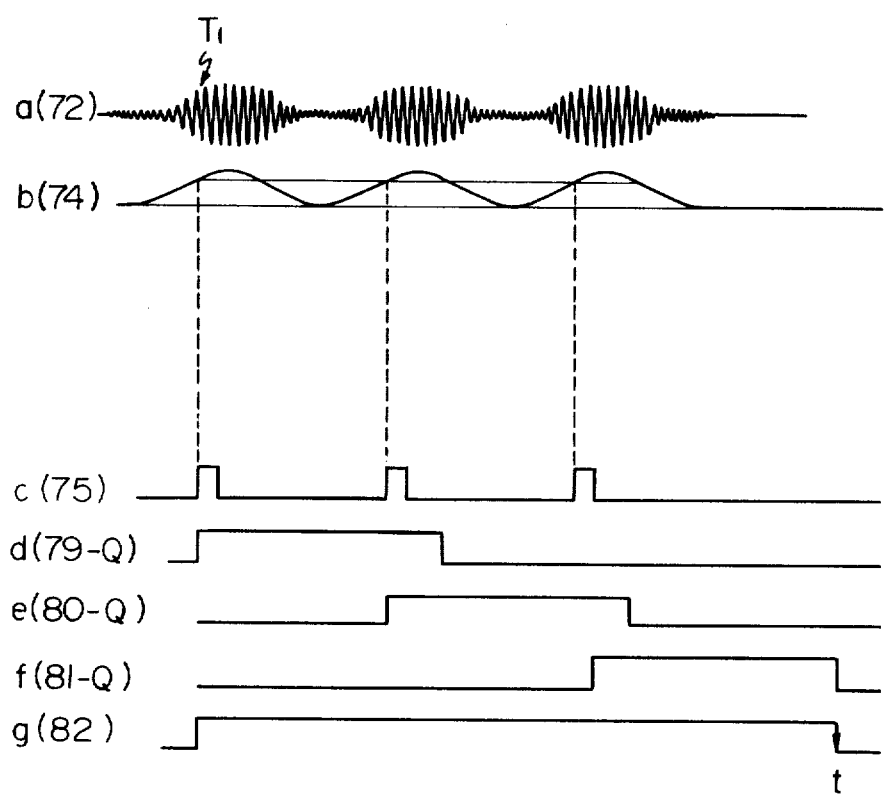
FIG. 10 shows the operational waveforms of the apparatus of FIG. 9, FIGS. 11, 11A and 11B are a block diagram of a remote control signal detector for the use of the control signal of FIG. 4, FIGS. 12, 12A and 12B are a block diagram of a remote control signal detector for the use of the control signal of FIG. 6.

FIG. 9 is a block diagram of a remote control signal detector 69 in FIG. 8, and the circuit of FIG. 9 is designed to detect the remote control signal in the format of FIG. 3. The detector of FIG. 9 detects the remote control signal for designating a repeater by detecting the particular period $T_1$ of the pattern, and designates one of three switches in the repeater by detecting the number of the periods $T_1$ in the pulse pattern $PN_1$. In FIG. 9, the reference numeral 72 is a tank circuit or a bandpass filter, 73 is a rectifier/detector, 74 is an integrator, 75, 79, 80 and 81 are monostable multivibrators, 76, 77, 78, 86, 87 and 88 are AND circuits, 82 is an OR circuit, 83 is a counter, 84 is a register, 85 is a switch selection circuit. The input terminal (IN) of the circuit of FIG. 9 receives the regenerated digital signal from the regenerator 68, and the regenerated digital signal is applied to the tank circuit 72, which detects the presence of the period $T_1$ by using a resonator resonated to the frequency $T_1$. The output of the tank circuit 72 is rectified by the circuit 73, the output of which is integrated in the integrator 74. When the output of the integrator 74 exceeds the predetermined level, the monostable multivibrator 75 is triggered, and the output pulse of the multivibrator 75 indicates that the period $T_1$ is detected. The output of the multivibrator 75 is applied to the AND circuits 76, 77 and 78 which trigger other monostable multivibrators 79, 80 and 81, respectively. The first AND circuit 76 provides the output when the first output is provided by the multivibrator 75, the second AND circuit 77 provides the output when the second output is provided from the multivibrator 75 when the multivibrator 79 is providing the output, and the third AND circuit 78 provides the output when the third output is provided from the multivibrator 75 when the multivibrator 80 is providing the output pulse. The above operation is shown in the waveforms of FIG. 10. In FIG. 10, the waveform (a) shows the output of the tank circuit 72 and has the period $T_1$, the waveform (b) shows the output of the integrator 74, the waveform (c) shows the output of the multivibrator 75, the waveform (d) shows the positive output Q of the multivibrator 79, the waveform (e) shows the output of the positive output Q of the multivibrator 80, the waveform (f) shows the positive output Q of the multivibrator 81, and the waveform (g) shows the output of the OR circuit 82. It is assumed that the duration of the pattern $PN_1$ in FIG. 3 is determined in the terminal station sufficiently so that the circuit of FIG. 9 detects the period $T_1$ and the output of the integrator 74 exceeds the threshold level. When the period $T_1$ is detected, it should be appreciated that the multivibrators 79, 80 and 81 provide the output signals in sequence according to the number of the transmission of the pattern $PN_1$. The pulse width of the multivibrators 79, 80 and 81 is a little longer than the duration of the outputs of the multivibrator 75 as shown in FIG. 10. When the level of the OR circuit 82 changes from the high level to the low level at the time (t) in FIG. 10 (g), the detector 69 recognizes that the transmission of the pattern $PN_1$ from the terminal station is finished, and the output of said OR circuit 82 has the content of the counter 83 transfer to the register 84, and resets the counter 83. It should be noted that the counter 83 stores the number of the transmission of the pattern $PN_1$ (in this embodiment, the content of the counter 83 is three). Thus, the transmission number of the pattern $PN_1$ is stored in the register 84. The AND circuits 86, 87 and 88 in the switch selector 85 provide a decoder of the content of the register 84, which comprise the first position 84a and the second position 84b. The AND circuit 88 provides the output when the lower position 84a is ON (Q=1 and $\overline{Q}=0$) and the higher position 84b is OFF (Q=0 and $\overline{Q}=1$), corresponding to the single pattern $PN_1$. The AND circuit 87 provides the output when the position 84a is OFF and the position 84b is ON, corresponding to two patterns. The AND circuit 86 provides the output when both the positions 84a and 84b are ON corresponding to three patterns. Each of the outputs of the AND circuits 88, 87 and 86 is provided to the related laser driving circuit 70 (FIG. 8) to actuate the selected laser.

Figure 11A:
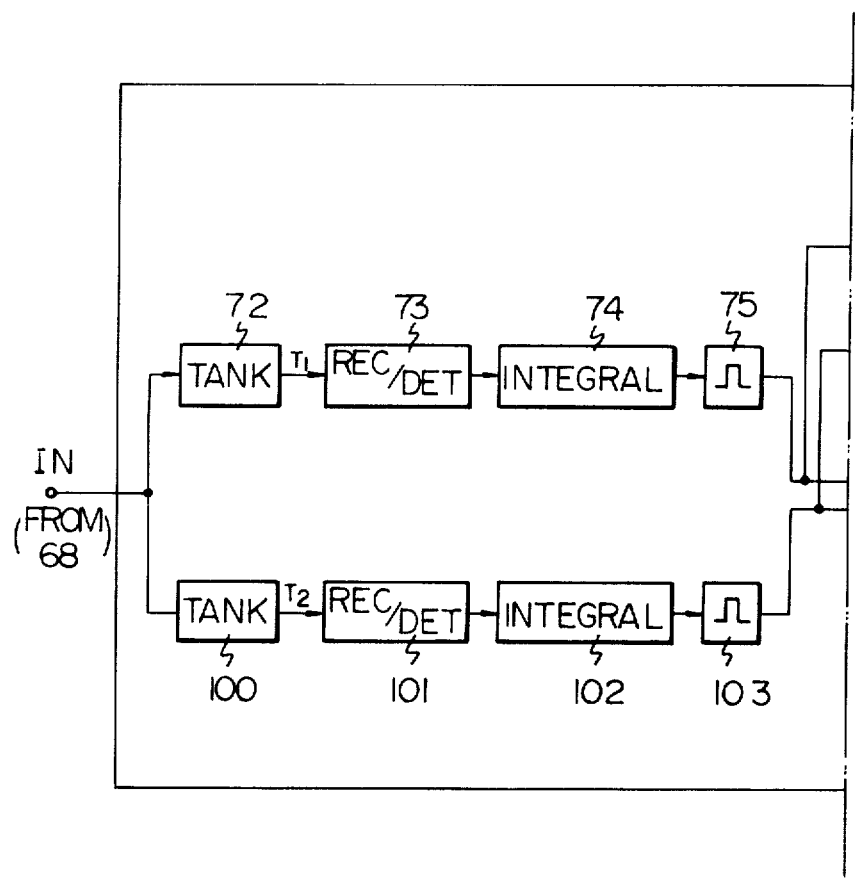
Figure 11B:
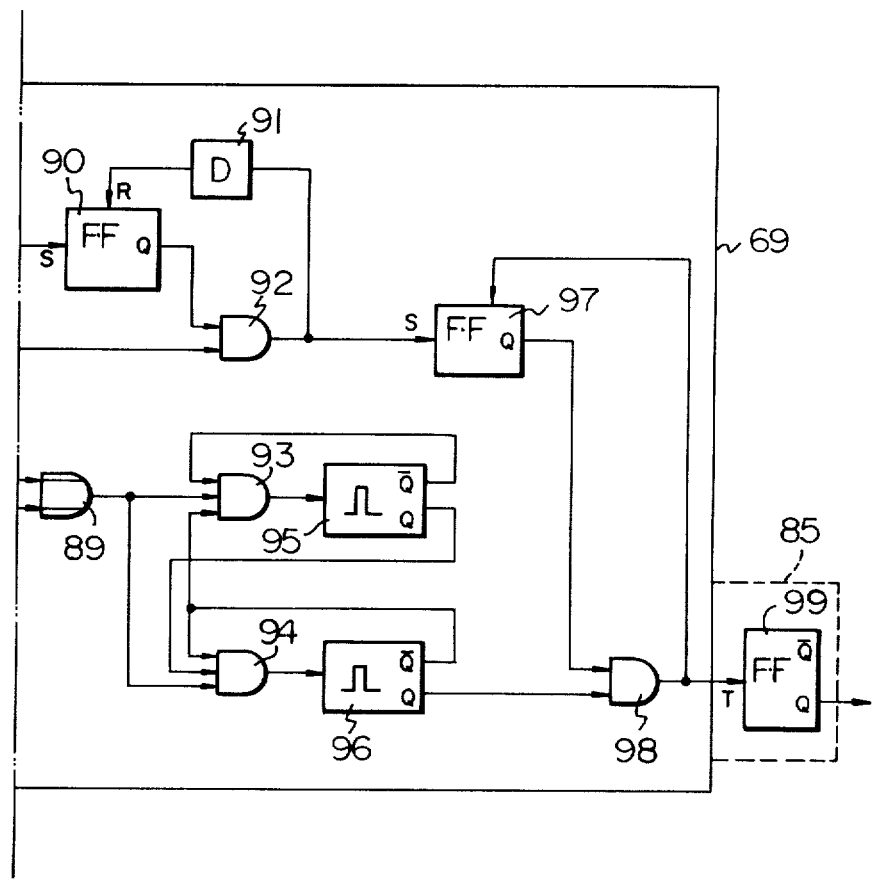

FIG. 11 is a block diagram of the remote control signal detector for the signal in the format of FIG. 4. In the figure, the reference numerals 72 through 75 are the same as those in FIG. 9. 100 is a tank circuit for detecting the particular period $T_2$ or a resonator having the related resonating frequency ($1/T_2$), 101 is a rectifier/detector, 102 is an integrator, 103, 95 and 96 are monostable multivibrators, 89 is an OR circuit, 92, 93, 94 and 98 are AND circuits, 90, 97 and 99 are flip-flops.

The operation of the signal detector of FIG. 11 is as follows. When the regenerated digital signal from the regenerator 68 in FIG. 8 is applied to the input terminal (IN), the circuits 72, 73 and 74 detect the period $T_1$ in the pattern $PN_1$, and the multivibrator 75 provides the output pulse when the output of the integrator 74 exceeds the predetermined level. The output of the multivibrator 75 is applied to another multivibrator 95 through the OR circuit 89 and the AND circuit 93, and said output of the multivibrator 75 sets the flip-flop 90. Thus, the detector recognizes the presence of the period $T_1$. Next, another tank circuit 100 detects the period $T_2$ in the pattern $PN_2$ and the output of the tank circuit 100 is applied to the integrator 102 through the rectifier/detector 101. When the output level of the integrator 102 exceeds the threshold level, the multivibrator 103 provides the output signal having the predetermined pulse width. At this time, it should be noted that the flip-flop 90 is in the ON state since it is set by the output of the period $T_1$. Therefore, the AND circuit 92 provides the output signal, which triggers the flip-flop 97. The flip-flop 97 indicates that the period $T_1$ is received first and the period $T_2$ is received later. The output of the AND circuit 92 resets the flip-flop 90 through the delay circuit 91. Also, the output of the OR circuit 89 triggers the monostable multivibrator 96 through the AND circuit 94. The relations of the outputs of 89, 95 and 96 are similar to those of 75, 79 and 80 in FIG. 10. The AND circuit 98 in FIG. 11 provides the logical product of the outputs of the flip-flop 97 and the multivibrator 96. When the AND circuit 98 provides the output, the flip-flop 97 is reset to OFF state, and the status of the flip-flop 99 in the switch selector 85 is reversed. The output of the flip-flop 99 indicates that the remote control signal having the periods $T_1$ and $T_2$ with the predetermined sequence has been received, and that output of the flip-flop 99 controls the switch in the repeater.

Figure 12A:
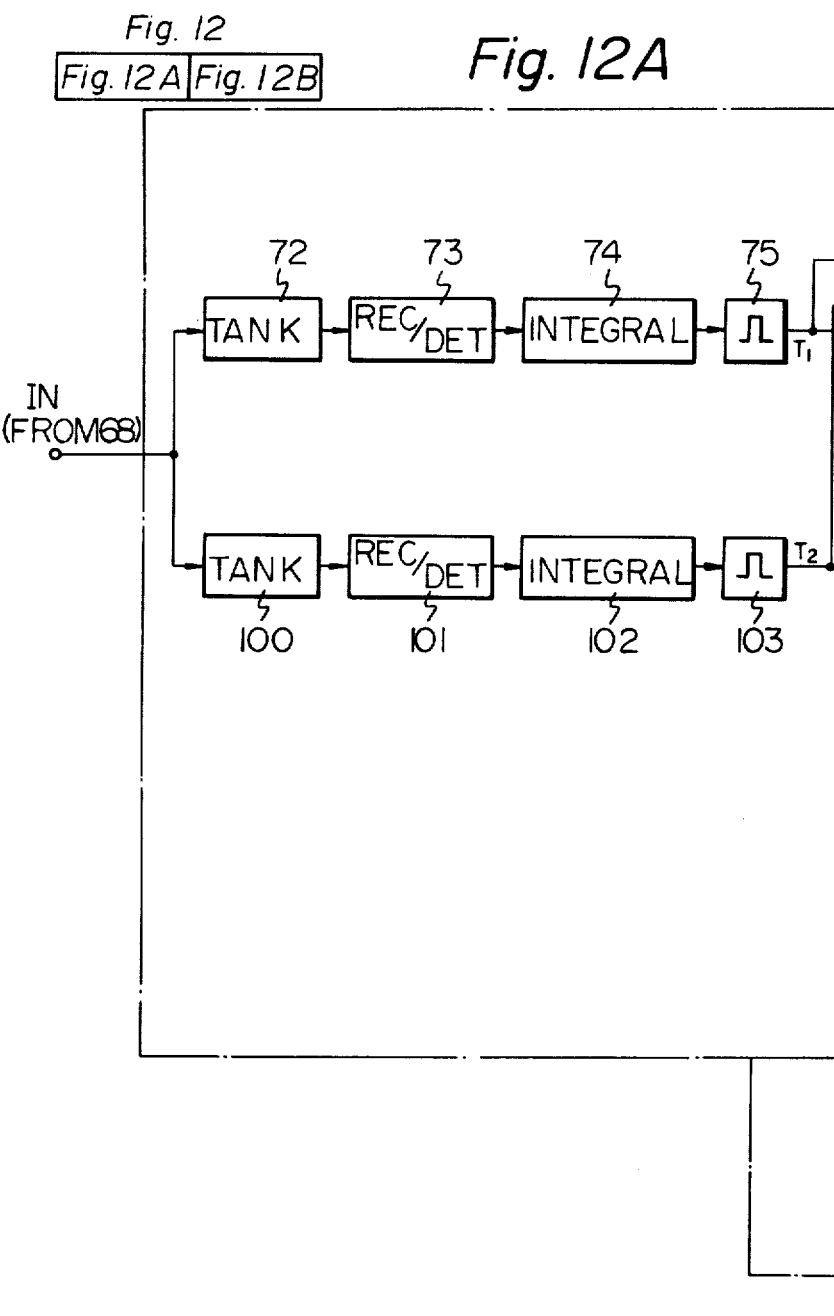
Figure 12B:
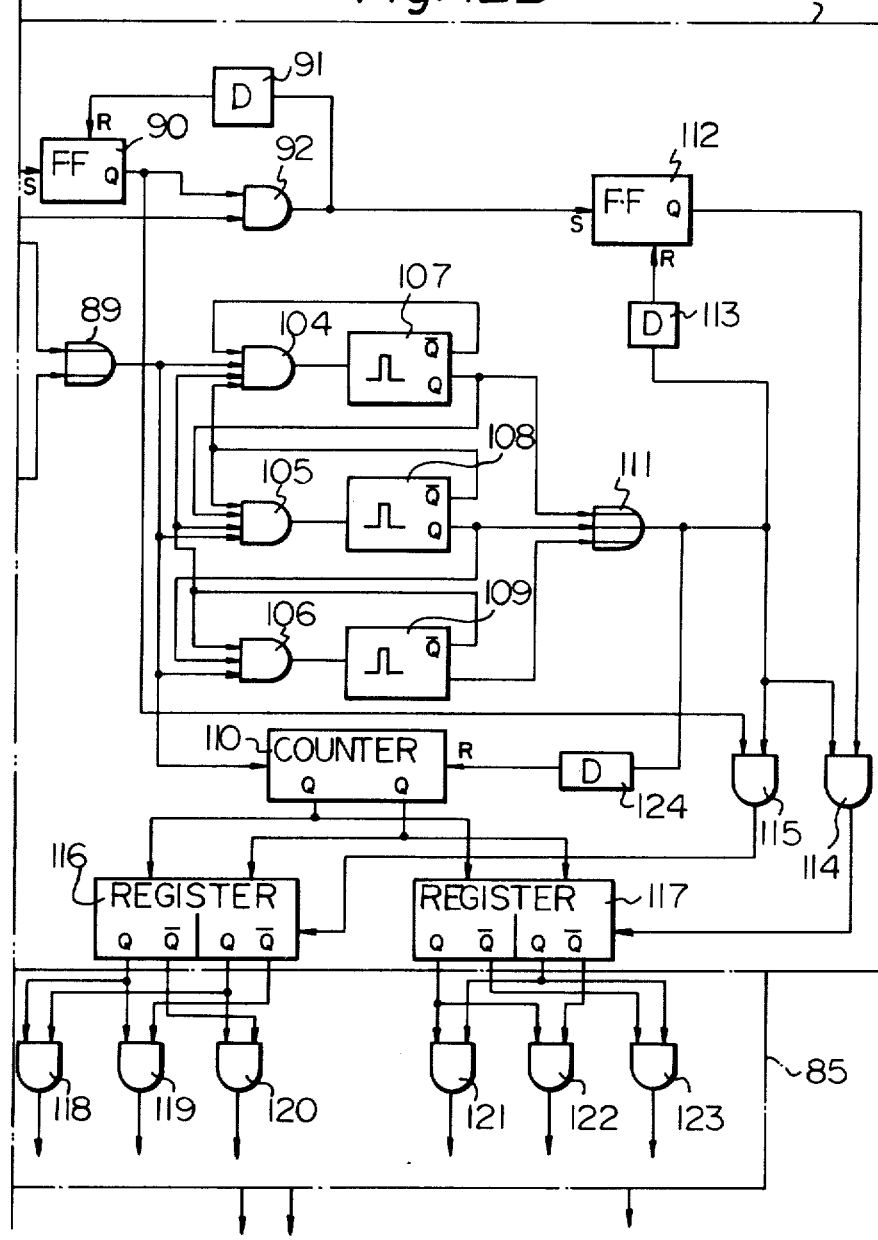

FIG. 12 is a block diagram of the remote control signal detector for the remote control signal in the format of FIG. 6. In the figure, the reference numerals 72, 73, 74, 75, 100, 101, 102, 103, 89, 90, 91 and 92 are the same as those in FIG. 11. The reference numerals 104, 105, 106, 114, 115, 118, 119, 120, 121, 122 and 123 are AND circuits, 111 is an OR circuit, 112 is a flip-flop, 113 and 124 are delay lines, 110 is a counter, 116 and 117 are registers.

When the period $T_1$ in the pattern $PN_1$ is detected by the circuits 72, 73, 74 and 75, the output of the multivibrator 75 triggers the monostable multivibrator 107 through the OR circuit 89 and the AND circuit 104. The output of the multivibrator 107 also sets the flip-flop 90 to the ON state, and the number of the output pulses of the multivibrator 75 is counted by the counter 110. Next, the output of the period $T_1$ stops for a while when the pattern PN is transmitted (see FIG. 6). The period $T_1$ is transmitted again in the pattern $PN_1$ after that pattern PN finishes.

When the second $T_1$ is detected, that is to say, when the multivibrator 75 provides the second output pulse, the monostable multivibrator 108 is triggered, and the counter 110 counts the number of the output pulses of the multivibrator 75. Next, when the third period $T_1$ is detected in the pattern $PN_1$, the counter 110 counts that output pulse, and the monostable multivibrator 109 is triggered. When the pattern $PN_1$ finishes, the output of the OR circuit 111 changes from the high level to the low level, and that change has the content of the counter 110 transfer to the register 116 through the AND circuit 115. Then, one of the AND circuits 118, 119 and 120 provides the output signal according to the number of the detections of the period $T_1$.

Next, when the period $T_2$ is transmitted in the pattern $PN_2$ from a terminal station, that period $T_2$ is detected by the circuits 100 through 103. When the multivibrator 103 provides the output pulse, the flip-flop 112 is set to the ON state through the AND circuit 92. The multivibrators 107, 108 and 109 are triggered also according to the number of detections of the period $T_2$, and the detection of each period $T_2$ is counted by the counter 110. When the pattern $PN_2$ finishes and the output of the OR circuit 111 changes from the high level to the low level, the content of the counter 111 is transferred to the register 117 through the AND circuit 114. The counter 110 is reset to zero after that transfer. As a result, one of the AND circuits 121, 122 and 123 provides the output signal according to the number of detection of the period $T_2$ in the pattern $PN_2$. Then, each output of each of the AND circuits 118 through 123 is applied to the corresponding switch to actuate the designated corresponding laser.

Next, the modification of the present invention is described. The remote control signal according to the present invention switches ON or OFF for the providing of a return path in the designated repeater, and a test signal transmitted from a terminal station returns to the same terminal station through that return path. The error rate of the transmission circuit and/or the characteristics of the transmission circuit can be measured by said test signal returned from the repeater.

Figure 13:
FIG. 13 is the format of still another remote control signal.
Figure 14:
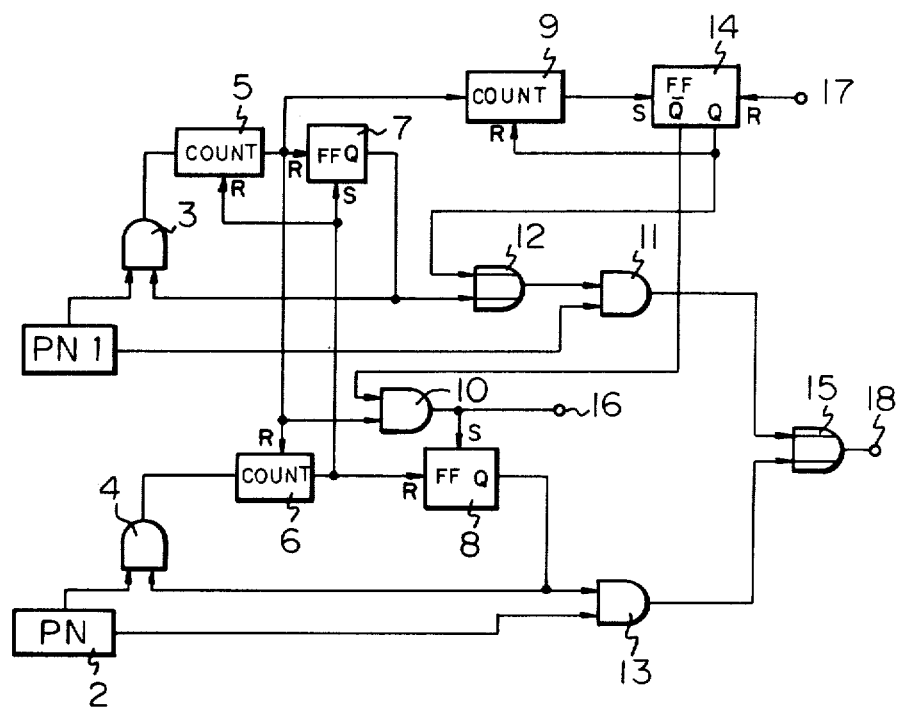
FIG. 14 is a block diagram of a remote control signal generator for the use of the control signal of FIG. 13.
Figure 15:
FIG. 15 is still another format of a remote control signal.
Figure 16:
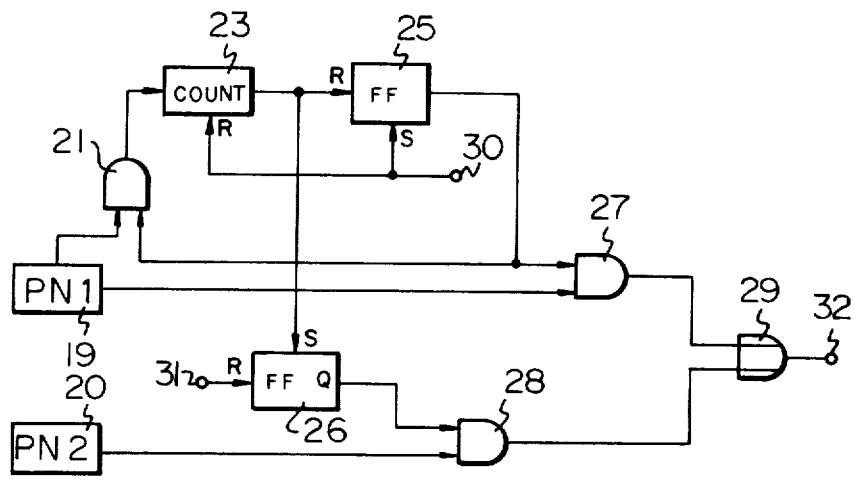
FIG. 16 is a block diagram of the remote control signal generator for the use of the control signal of FIG. 15.
Figure 17:
FIG. 17 is still another format of a remote control signal.
Figure 18B:
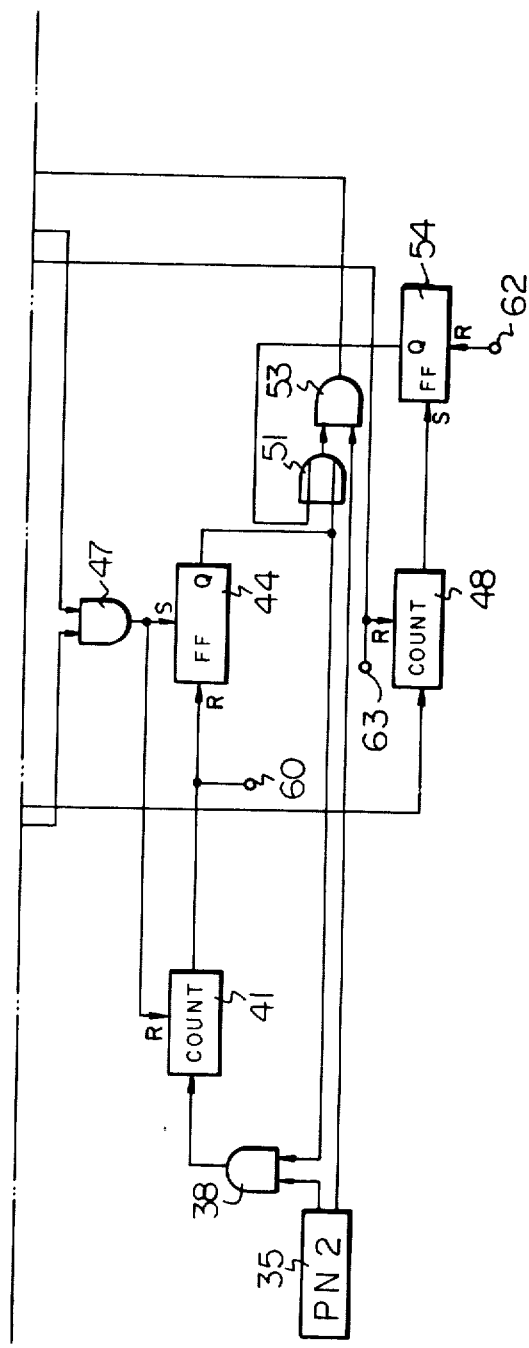
Figure 19:
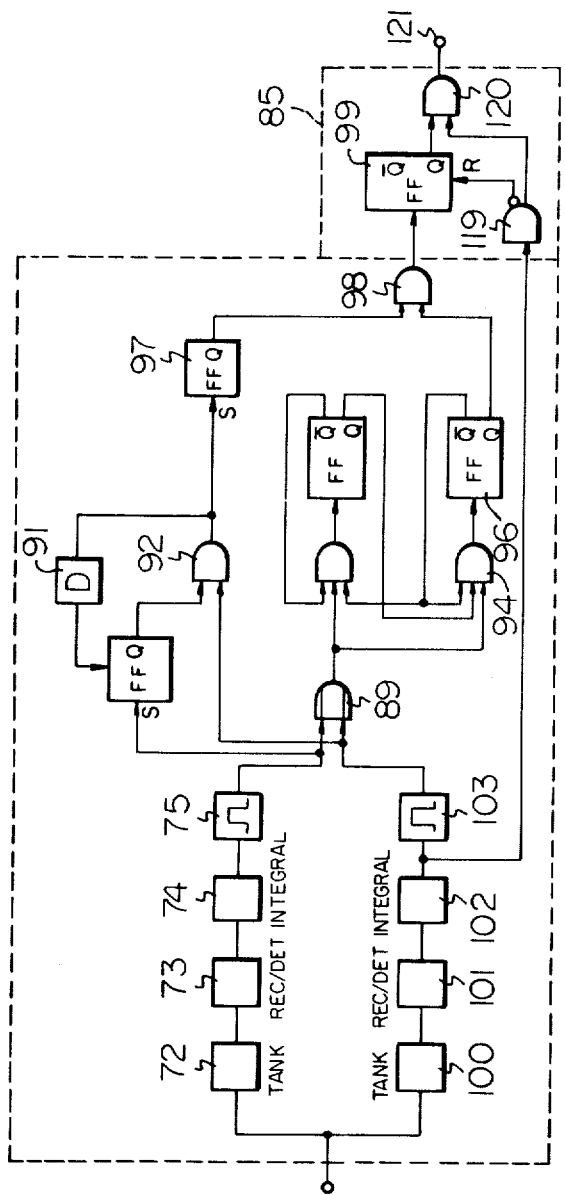
FIG. 19 is a block diagram of a circuit for switching control of a return path for a control signal.

In this modification, the remote control signal is shown in FIG. 13, FIG. 15 and FIG. 17, which are the modifications of the signals of FIG. 3, FIG. 4 and FIG. 6, respectively. In the remote control signal of FIG. 13, the pattern $PN_1$ is reflected by the repeater which is designated by the preceding pattern PN. In the remote control signals of FIG. 15 and FIG. 17, the pattern $PN_2$ is reflected by the designated repeater. Those reflected patterns are utilized as a test signal. The remote control signals or the test signals shown in FIGS. 13, 15 and 17, respectively are provided by the remote control signal generators shown in FIGS. 14, 16 and 18, respectively, which are the modification of the apparatuses of FIGS. 2, 5 and 7, respectively. In case of the remote control signal in FIG. 16, the remote control signal detector of FIG. 19 is utilized. The apparatus of FIG. 19 has the AND circuits 119 and 120 in addition to the apparatus of FIG. 11, and by the presence of those AND circuits, the remote control signal is reflected for the duration that the pattern $PN_2$ exists. In FIG. 19, the output of the integrator 102 is applied to the AND circuit 120, which receives also the output of the flip-flop 99, and the output of the AND circuit 120 is returned to the terminal station.

Finally, FIG. 20 is a block diagram of an optical repeater which has a signal return path. In FIG. 20, the reference numeral 118 is a switch for providing the signal return path, and said switch 118 is controlled to ON or OFF state by the control signal at the terminal 121 at the output of the switch selector 85. When that switch 118 is closed, a part of the remote control signal transmitted from a terminal station is returned to the terminal station itself through the opposite transmission circuit, and then, the terminal station can measure the bit error rate using the returned signal. When the terminal station stops the remote control signal, the switch 118 is automatically opened and the return path is released.

As described above in detail, the present invention utilizes the remote control signal as shown in FIG. 3, FIG. 4 or FIG. 6 having a single or plurality of particular periods with the predetermined sequence and the predetermined number of occurances. And the particular repeater and/or the particular switch in the designated repeater can be designated by said remote control signal. Then, the designated switch controls the optical source which has the redundant arrangement having a plurality of lasers, and/or controls the return path switch for monitoring the operation of the repeater. Thus, the digital transmission path with the high operational reliability in an optical communication system is provided.

From the foregoing, it will now be apparent that a new and improved remote control system of an optical repeater has been found. It should be understood of course that the embodiments disclosed are merely illustrative and are not intended the scope of the invention. Reference should be made to the appended claims, therefore, rather than the specification as indicating the scope of the invention.

What is claimed is:

1. A remote control system in an optical communication system comprising a plurality of optical repeaters inserted in an optical fiber line, a pair of terminal stations installed at ends of said optical fiber line for digital communication between said terminal stations, each of said optical repeaters having a plurality of switches for controlling operation of its own repeater, and each of said switches being controlled by one of said terminal stations, characterized in that (a) one of said terminal stations has a remote control signal generator for transmitting a remote control test signal to the other terminal station only through the same optical fiber line and said optical repeaters, said remote control test signal having a pseudo noise pulse pattern of a predetermined period and a predetermined number of repetitions of said period, said predetermined period and said predetermined number of repetitions of said period designating a particular repeater and a particular switch in said particular repeater, (b) each of said optical repeaters having a remote control signal detector for recognizing said remote control test signal as designating said particular repeater and said particular switch in said particular repeater, and means for accepting said remote control test signal without change and without a separate pulse generator for testing said particular repeater and said particular switch by using said pseudo noise pulse pattern to perform the tests and transmitting said pattern back to said terminal station.

2. A remote control system of an optical repeater according to claim 1, wherein said remote control signal has a plurality of periods in the pulse pattern, and a combination of each period designates the repeater and the switch in the designated repeater.

3. A remote control system of an optical repeater according to claim 2, wherein said remote control signal has a plurality of periods in the pulse pattern, and a combination and a sequence of each period designates the repeater and the switch in the designated repeater.

4. A remote control system of an optical repeater according to claim 1, wherein said remote control signal generator has a first pulse pattern generator which provides a first pulse pattern (PN) and a second pulse pattern generator ($PN_1$) which provides a second pulse pattern ($PN_1$) having a period ($T_i$), and means for alternately transmitting said first pulse pattern and said second pulse pattern to said optical fiber cable until a predetermined number of second pulse patterns ($PN_1$) are transmitted, and said remote control signal detector has a tank circuit for detecting said period ($T_i$) in said second pulse pattern ($PN_1$), means for providing a pulse signal upon detection of said period ($T_i$) by said tank circuit, counting means for counting said pulse signal, and a decoder means for providing a plurality of decoded outputs according to said counting means to each of said switches, wherein said period ($T_i$) corresponds to said particular repeater to be designated, and said number of second pulse patterns ($PN_1$) corresponds to said particular switch in said particular repeater.

* * * * *